June 24, 1947.　　R. J. BURROWS ET AL　　2,422,885
SWING LINK CONSTRUCTION
Filed Feb. 6, 1945
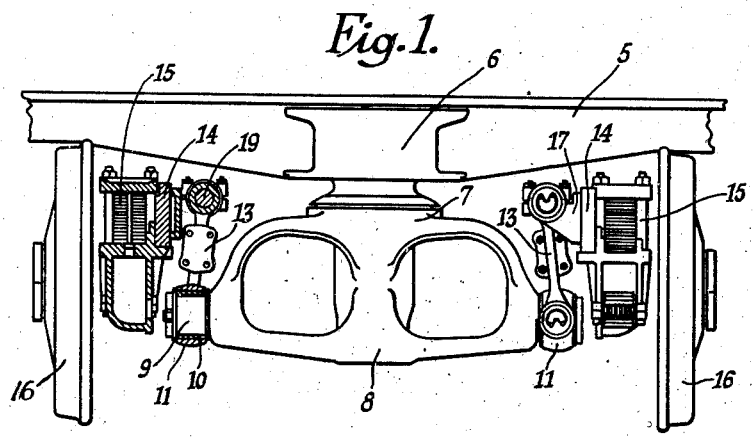
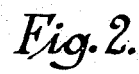
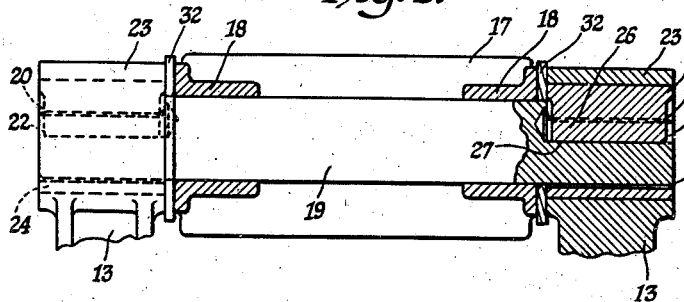
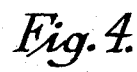
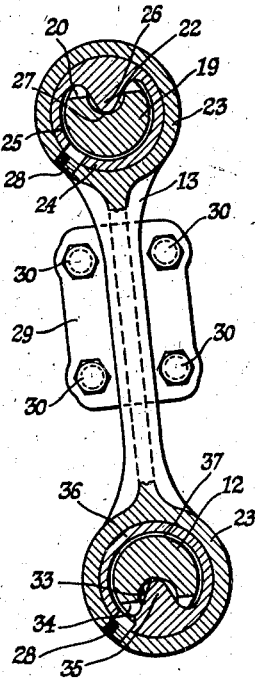
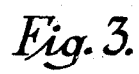
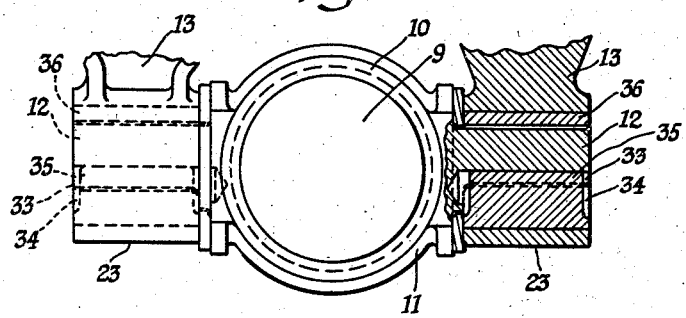
INVENTOR.
Robert J. Burrows & Alfred O. Williams
BY Walter E. Schirmer
Attorney Patented June 24, 1947

2,422,885

UNITED STATES PATENT OFFICE 2,422,885

SWING LINK CONSTRUCTION

Robert J. Burrows and Alfred O. Williams, Battle Creek, Mich., assignors to Clark Equipment Company, Buchanan, Mich., a corporation of Michigan Application February 6, 1945, Serial No. 576,465

8 Claims. (Cl. 105—190)

This invention relates to swing link constructions, and more particularly is concerned with a swing link construction for supporting a transversely extending bolster within a rail truck such as may be used on rail vehicles, rapid transit urban street cars, elevated trains and the like.

It has been found in swing link constructions heretofore used in vehicles of this type that the bearing support for the swing link is normally composed of circular bushings supporting the link from the shaft, and because of the fact that the pressure is localized on such bearings it has been impossible to provide adequate or satisfactory lubrication between the bearing and the link with a result that in short periods of time the bearing has frozen to the link or to the shaft in such manner as to wear rapidly, resulting in frequent replacements or actual destruction of the assembly.

To overcome these disadvantages the present invention contemplates a construction in which the swing links are supported by a bushing arrangement which has a single-line contact with the supporting shaft, the bushing having an extending tongue or cam portion rocking in an arcuate recess formed in the supporting shaft whereby a support similar to that commonly known as a "knife-edge" support is provided with the exception that a rounded surface contact is provided rather than a sharp knife edge. This eliminates the necessity of lubrication which, in turn, eliminates the necessity of closing up the end of the shaft and provides a construction in which there can be no freezing of the bushing due to lack of proper lubrication.

The complete encircling of the bushing and shaft or arm ends by the journal collars at opposite ends of the swing link prevents separation of these parts in case of accident or unusual forces which might tend to displace the adjacent members.

The same type of support is provided between the swing link and the bolster thereby also eliminating any necessity for lubrication at these points.

The construction is relatively simple, and can be attached to existing trucks now in use with slight modification.

Other objects and advantages of the present invention will appear more fully from the following detailed description which, taken in conjunction with the accompanying drawings, will disclose to those skilled in the art the particular construction and operation of a preferred form of the present invention.

In the drawing:

Figure 1 is a transverse sectional view through a rail truck embodying the present invention;

Figure 2 is an elevational view, partly in section, of the upper support bracket for the swing link;

Figure 3 is a corresponding view showing the lower connection of the swing links to the cross member in which the transom is trunnioned; and Figure 4 is an end view, partly in section, illustrating the swing link mounting.

Referring now in detail to the drawings, in Figure 1 there is disclosed a car body 5 having a king pin supporting portion 6 whereby the car body may be supported in the seat 7 formed in the transversely extending bolster 8. The bolster 8 has oppositely extending trunnioned ends 9 adapted to be received within suitable bushings 10 carried by the cross members 11, which cross members have projecting stub shaft portions 12 as shown clearly in Figure 3. The bolster is thus arranged for rocking movement in a transverse plane relative to the car truck, and is also supported for lateral swinging movement by means of the swing links indicated generally at 13.

The truck frame itself includes longitudinally extending side members 14 which may be as shown in the form of plate sections as shown in our Patent No. 2,336,661, issued December 14, 1943, or may be tubular members. The side frame members are supported by any suitable spring support such as the leaf springs 15 upon the axle housings (not shown) through which the driving axles of the truck extend carrying the rail wheels 16.

Mounted on the inboard sides of the side frame members by welding, bolting or in any other suitable manner are bracket members 17, which bracket members, as shown in Figure 2, have inwardly offset journal portions 18 receiving the shaft 19 extending parallel to the side frame members 14. The shaft 19 adjacent its ends is milled off as indicated at 20 and has an arcuate bore formed therein as indicated at 22 forming a substantially semi-cylindrical longitudinally extending recess. Each end of the shaft 19 which projects beyond the bracket 17 is formed in this manner.

Mounted on the oppositely extending ends of the shaft 19 are the swing links 13, formed of two swing link halves. These swing links comprise arm members having journal portions 23 at opposite ends thereof forming cylindrical collars fitting about the shaft ends 19 and about the arm ends 12 of the trunnion bracket 11.

Disposed in each of the collar portions 23 of the swing links is a bushing member 24, which bushing member has a normal internal diameter slightly greater than the external diameter of the shaft 19 providing annular clearance as indicated at 25. The bushing 24 is also provided with a radially inwardly extending tongue portion 26 of a longitudinal extent substantially equal to that of the arcuate recess 22 in the ends of the shaft 19 and is provided with a rounded terminating edge as indicated at 27, seating in the recess 22 and rocking therein about a substantially narrow line contact. The bushing 24 is preferably made of a hard brass or bronze, and is held against rotation relative the collar portion 23 of the swing link by means of the headless pins 28. In a preferred form of the construction the swing link is made in two halves, one half at each end of the shaft 19, the swing link halves being arranged with normally extending boss portions 29 adapted to be bolted together to carry the two half swing links 13 rigidly together as a unit as by means of the bolts 30. A suitable thrust washer 32 is interposed between the swing links and the journal portions 18 of the bracket 7. It will therefore be seen that the weight of the bolster 8 is supported from the bracket 17 by the pressure engagement of the tongue 26 within the recess 22 of the ends of shaft 19, and that oscillation of the link produces a rocking action of the tongue within the arcuate recess, and requires no lubrication, nor is there any chance of the bushing 24, because of lack of lubrication, sticking or freezing to the ends of the shaft 19.

The stub arms 12 of the trunnion bracket 11 which directly supports the bolster 8 are also provided with the arcuate bores 33 and the milled-off portion 34 for receiving the tongue portion 35 of a bushing 36 secured in the lower collar portions 23 of the swing link 13. The bushing 36 has annular clearance about the arm ends 12 as indicated at 37, and the tongue portions 35 thereof have rocking engagement within the arcuate recess 33. It will be apparent that in the lower end construction of the swing link the stub arms 12 carry the weight of the bolster and impose this weight through the ends thereof on to the inwardly extending projections or rocking portions 35 of the bushings 36 whereby the loads are all carried through this interengaging rocking surface. The bushing 36 is also composed preferably of a hard brass or bronze material, and the arm ends 12 as well as the shaft 19 are preferably formed of steel. With this construction the ends of the shaft 19 as well as the ends of the arms 12 can be left open, there being no necessity for providing closure means to retain lubricant therein, since no lubricant is required with this type of knife-edge construction.

With this arrangement it will be noted that the limited oscillating movement produced by the bolster in one case on the lower ends of the swing links and produced by lateral shifting of the truck frame relative the bolster on the upper ends of the links will be accommodated by the rocking action of the bushings 36 and 24 respectively in the corresponding recessed portions of the arm ends 12 and the ends of the shaft 19. The bushings are locked against relative movement with respect to the journal ends 23 of the swing links 13 by means of headless pins 28 so that the only relative movement is provided between the tongue 35 rocking in the recesses 33 and at the upper end the tongue 26 rocking in the recesses 22. It is to be understood that it is not essential that the recesses 22 and 33 be arcuate, as any desired bearing surface may be employed, but the recessing introduces limited frictional resistance which in some cases may be desirable.

It is therefore believed apparent that we have provided a novel type of swing link construction which overcomes the difficulties heretofore encountered in such a construction, and which can be readily assembled into existing bolster and truck assemblies with little or no change.

We are aware that various changes may be made in certain details of the construction herein disclosed, and we therefore do not intend to be limited except as defined by the scope and spirit of the appended claims.

We claim:

1. Cradling means for a transverse truck bolster disposed between parallel longitudinally extending side frame members, comprising swing links pivotally supporting said bolster from said members, each swing link having annular collar portions at its ends, bushings rigidly secured in said collar portions and having radially inwardly extending tongues, and pivot arms on said side frame members and said bolster extending axially into but radially spaced from said bushings and having axially spaced bearing surfaces in which said tongues are supported for rocking movement, said surfaces including portions for limiting swinging movement of said links therein.

2. In a rail truck, a side frame member, a bracket secured thereon having oppositely extending pivot arms provided with axially extending arcuate recesses in the ends thereof, a transverse bolster having pivot arms at the end thereof of adjacent said side frame member extending parallel to said first pivot arms and having corresponding recesses, swing links having bearing portions at the ends thereof including fixed bushings receiving said arms, said bushings including radially inwardly directed tongue portions having rocking contact in said recesses, and means for securing said links together intermediate their ends for conjoint movement.

3. The truck of claim 2 wherein said bushings have radial clearance about said arms.

4. In combination, a rail truck bolster having a trunnion end, a trunnion bracket receiving said end and including oppositely extending pivot arms, each of said arms having an axially extending arcuate recess in the lower surface thereof, swing links having collar portions for receiving said arms, bushings fixed in said collar portions and having radial clearance about the annular portions of said arms, said bushings having integral radially inwardly extending tongue portions providing rocking line contact within said recesses for transmitting the load of said bolster to said links.

5. The combination of claim 4 including means for securing said links together for conjoint movement.

6. In combination, a rail truck having a side frame member, a bracket secured thereto, a shaft carried by said bracket parallel to said member and having pivot end portions provided with axially extending arcuate recesses in the upper surface thereof, swing links having collar portions at the upper ends thereof, and bushings fixed in said collar portions and having radially inwardly directed tongues, said tongues engaging in said recesses to provide rocking contact of said links on said end portions of said shaft when said collar portions are positioned over said shaft end portions.

7. The combination of claim 6 including means for securing said links together for conjoint movement.

8. In combination, a rail truck having laterally spaced side frame members, a transversely extending bolster therebetween, means secured to said side frame members including oppositely extending pivot arms, means secured to the ends of said bolster providing corresponding oppositely extending pivot arms, each of said pivot arms having axially extending arcuate recesses, swing links having end portions enclosing said pivot arms of said bolster and side frame member, and bushings secured in said end portions having radial tongue portions extending into said recesses providing rocking line contact said links and arms for cradling lateral swinging of said bolster relative said side frame members.

ROBERT J. BURROWS.
ALFRED O. WILLIAMS.

REFERENCES CITED

The following references are of record in the file of this patent:

UNITED STATES PATENTS

| Number | Name | Date |
| --- | --- | --- |
| 881,949 | Price | Mar. 17, 1908 |
| 2,197,110 | Muchnic | Apr. 16, 1940 |
| 2,226,636 | Piron | Dec. 31, 1940 |
| 2,309,634 | Edahl et al. | Feb. 2, 1943 |
| 507,153 | Morse | Oct. 24, 1893 |
| 1,159,163 | Best | Nov. 2, 1915 |